United States Patent [19]

Gospodar

[11] 3,800,772

[45] Apr. 2, 1974

[54] PROCESS FOR PREHEATING AN EXHAUST GAS PURIFYING DEVICE

[75] Inventor: Reinhard Gospodar, Wolfsburg, Germany

[73] Assignee: Volkswagenwerk Aktiengesellschaft, Wolfsburg, Germany

[22] Filed: Dec. 20, 1972

[21] Appl. No.: 316,837

[30] Foreign Application Priority Data
Dec. 21, 1971 Germany............................ 2163537

[52] U.S. Cl........................ 60/274, 60/284, 60/300, 60/303, 60/307, 123/198 F
[51] Int. Cl........................ F02b 75/10, F01n 3/14
[58] Field of Search............. 60/274, 284, 286, 300, 60/303, 307; 123/198 F

[56] References Cited
UNITED STATES PATENTS

| 2,918,047 | 12/1959 | Mick | 123/198 F |
|---|---|---|---|
| 2,937,490 | 5/1960 | Calvert | 60/284 |
| 3,192,706 | 7/1965 | Dolza | 60/307 |
| 3,578,116 | 5/1971 | Nakajima | 123/198 F |

Primary Examiner—Douglas Hart
Attorney, Agent, or Firm—Brumbaugh, Graves, Donohue & Raymond

[57] ABSTRACT

A process for preheating an exhaust gas purifying device for an internal combustion engine. The process includes the steps of interrupting fuel delivery to at least one cylinder of the engine when starting the engine; introducing into the purifying device the air drawn in and exhausted by the cylinder to which fuel delivery is interrupted; and igniting a mixture of the air and added fuel in the purifying device. The air from the cylinder may be introduced into the purifying device either together with or separately from exhaust gases from the other cylinders and at least a portion of the air may be stored before being introduced into the purifying device to equalize the flow. The air may be mixed with the fuel either before or after it is introduced into the purifying device and the fuel with which the air is mixed may include excess fuel accumulated in and exhausted by the other engine cylinders.

10 Claims, 2 Drawing Figures

PATENTED APR 2 1974 3,800,772

PROCESS FOR PREHEATING AN EXHAUST GAS PURIFYING DEVICE

BACKGROUND OF THE INVENTION

To meet the increasingly stringent regulations regarding the content of exhaust gases from internal combustion engines, which are being proposed and enforced in the United States and other countries, devices have been developed to purify exhaust gases. One type of purifying device is connected to the exhaust system of an automobile so as to treat gases exhausted by the engine cylinders before the gases are released to the atmosphere. Such an exhaust gas purifying device operates satisfactorily, however, only after it is heated to a predetermined operating temperature. Accordingly, when an engine equipped with the purifying device is initially started, the purifying device must be heated to its operating temperature as quickly as possible.

One common method of preheating an exhaust gas purifying device is to use an electric heating element. The electrical energy required by electric heating elements must be supplied by an automobile battery or generator, however, and conventional batteries and generators are not sufficiently powerful to supply the additional electrical energy necessary. Thus, automobiles that are equipped with exhaust gas purifying devices preheated by electric heating elements must have correspondingly larger batteries or generators. In addition, electric heating elements take a relatively long period of time to preheat a purifying device to its operating temperature.

Another common method of preheating an exhaust gas purifying device is to burn a mixture of air and fuel in the purifying device. Burning an air-fuel mixture in the purifying device has advantages over using an electric heating element because the combustion does not require a larger electric battery or generator and it takes a relatively shorter period of time to preheat the purifying device. Nonetheless, it is necessary to supply a sufficient quantity of air to the purifying device to enable the air-fuel mixture to be ignited. Generally, air is delivered to the purifying device by a special blower, which increases the complexity of the automobile exhaust system and causes a corresponding increase in production and maintenance costs. Moreover, the limited space available in which to install a special blower for the purifying device increases the difficulty and, therefore, the expense of providing the purifying device.

Previous efforts to preheat an exhaust gas purifying device more rapidly have also involved moving the purifying device as close as possible to the automobile engine to obtain the maximum benefit of the heat produced by the engine. The proximity of the engine, however, often results in over-heating and permanently damaging the purifying device during the subsequent operation of the engine, due to the higher temperatures of both the engine and the purifying device.

SUMMARY OF THE INVENTION

The present invention relates to a process for preheating an exhaust gas purifying device for an internal combustion engine which improves upon the prior art method of burning an air-fuel mixture within the purifying device, without requiring a special blower or locating the purifying device in a potentially damaging proximity to the engine. The process includes the steps of interrupting fuel delivery to at least one cylinder of the engine when starting the engine; introducing into the purifying device the fresh air drawn in and exhausted by the cylinder to which fuel delivery has been interrupted; and igniting a mixture of the fresh air and added fuel in the purifying device to preheat it.

The inventive process thus effectively utilizes an engine cylinder and its associated piston as an air pump, eliminating the necessity of having a special blower for the purifying device. In addition, the process preheats the purifying device rapidly enough to allow the purifying device to be located sufficiently far away from the engine to avoid overheating and permanent damage.

Several variations of the inventive process are possible, according to the desirability of utilizing existing tooling and components or of acheiving further refinement of the process according to the present invention. For example, fresh air drawn in and exhausted by the engine cylinder to which fuel delivery has been interrupted can be introduced into the purifying device together with exhaust gases from other cylinders, requiring no structural changes in a conventional automobile exhaust line arrangement. On the other hand, if the cylinder to which fuel delivery has been interrupted is connected to the purifying device by a separate exhaust line and is the farthest cylinder from the purifying device, the pulsating flow of air exhausted by the cylinder is smoothed into a more regular and even flow because of the length of the exhaust line and the absence of disturbing flow of exhaust gases from other engine cylinders. With a smoother flow of air into the purifying device, the combustion of the air-fuel mixture within the purifying device is more regular and the preheating of the purifying device is more even and effective.

Another variation of the inventive process involves storing at least a portion of the air from the cylinder to which fuel delivery has been interrupted before introducing the air into the purifying device. Storing the air also smoothes out its pulsating flow. Storage may be effected by interposing a storage tank with a dosing nozzle between the cylinder and the purifying device.

The air exhausted by the engine cylinder to which fuel delivery has been interrupted can be mixed with fuel for ignition in the purifying device either before or after the air is introduced into the purifying device. Fuel for the purifying device may be delivered by a fuel injection nozzle, for example, located within the purifying device or on one of the exhaust lines leading to the purifying device. Fuel delivery may be simplified, however, by utilizing excess fuel which is accumulated in the engine cylinders that are firing when the engine is started and which is exhausted, unburned, with exhaust gases from the cylinders. The excess fuel may provide all or only a portion of the fuel required to preheat the purifying device.

BRIEF DESCRIPTION OF THE DRAWING

For a better understanding of the invention, reference may be made to the following description of two exemplary embodiments, taken in conjunction with the figures of the accompanying drawing, in which.

DESCRIPTION OF EMBODIMENTS

Figure 1:
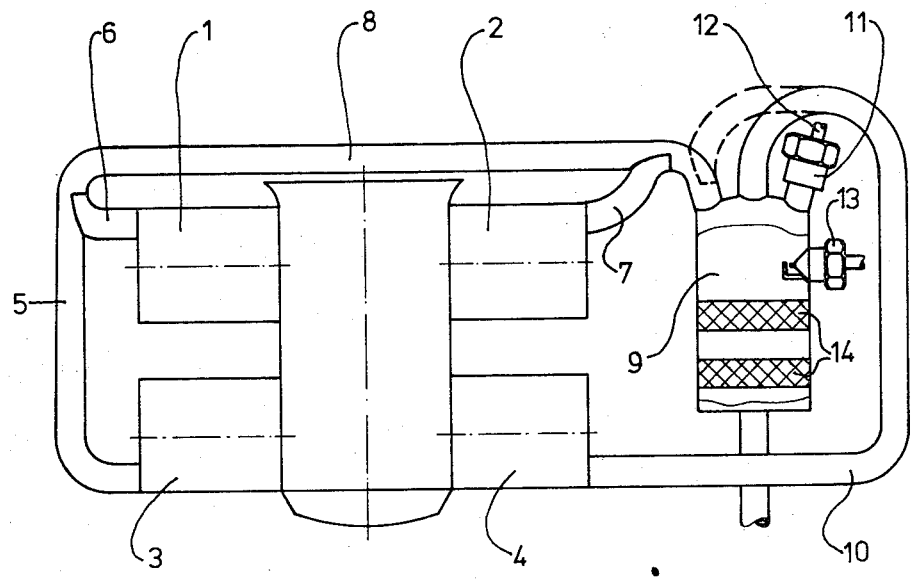
FIG. 1 is a schematic view of an internal combustion engine having paired cylinders and an exhaust gas purifying device arranged to function according to the invention.

FIG. 1 illustrates an internal combustion engine having four cylinders 1, 2, 3 and 4 arranged in a paired configuration. Cylinders 1, 2 and 3 are provided with exhaust lines 6, 7 and 5, respectively, which may be formed of metal pipe, for example. Each of the exhaust lines 5, 6 and 7 communicates with a collecting exhaust line 8 which leads into an exhaust gas purifying device 9. The exhaust line 10 from the remaining cylinder 4 leads into the purifying device 9 by a less direct route and does not communicate with the collecting exhaust line 8. Although it is preferred that exhaust line 10 not communicate with collecting exhaust line 8, for reasons that will be set forth hereinafter, it is within the scope of the present invention for the exhaust line 10 to communicate with the collecting exhaust line 8 in the manner of exhaust lines 5, 6 and 7 and as shown by the dashed lines in FIG. 1.

The exhaust gas purifying device 9 has a connecting fitting 11 which receives a fuel delivery line 12, as shown in FIG. 1, for introducing fuel into the purifying device 9. The end of the fuel delivery line 12 may be coupled directly to the fitting 11, or a device for regulating the flow of fuel, such as a fuel injection nozzle, may be attached to the end of the fuel delivery line 12 before it is coupled to the fitting 11. It is also within the scope of the invention to deliver the fuel for the purifying device through the exhaust line 10 or the collecting exhaust line 8. In particular, excess fuel accumulated in the cylinders 1, 2 and 3 during the starting of the engine and exhausted in an uncombusted state by the cylinders 1, 2 and 3 may be carried through the exhaust lines 6, 7 and 5, respectively, and the collecting exhaust line 8 and thus introduced into the purifying device 9. Fuel may also be introduced into any of the exhaust lines 5, 6, 7 or 10 or into the collecting exhaust line 8 by a fuel injection nozzle, for example, instead of or in addition to introducing fuel directly into the purifying device 9 through the connecting fitting 11.

The purifying device 9 additionally includes a device 13, such as a spark plug, for igniting a mixture of air and fuel in the purifying device. Two catalysts 14, which operate in the manner well known in the art, are also provided.

To operate the above described engine according to the inventive process, fuel delivery to the cylinder 4 is interrupted when the engine is being started while relatively cold. The fresh air drawn in by the cylinder 4 is thus exhausted by the cylinder without being mixed with fuel or ignited. The exhausted air is carried by the exhaust line 10 to the purifying device 9. In the purifying device 9, the air from cylinder 4 encounters and is mixed with fuel introduced into the purifying device 9 through the connecting fitting 11. The mixture of fuel and air is then ignited by the spark plug 13, resulting in combustion of the mixture and transfer of heat to the purifying device 9. When the purifying device 9 has been preheated to its operating temperature, fuel delivery to the cylinder 4 is resumed to permit the cylinder 4 to function in a conventional manner and fuel delivery to the purifying device 9 is interrupted.

As noted above, the arrangement of exhaust line 10 in the engine of FIG. 1 permits the inventive process to be practiced in a preferred manner. The operation of the cylinder 4 is such that fresh air is not continuously drawn in and exhausted by the cylinder, but rather the fresh air is drawn in and exhausted by the cylinder in distinct batches or pulses, thus creating a pulsating flow of air in the exhaust line 10. Such a pulsating flow inhibits efficient combustion of the air and fuel mixture in the purifying device 9 and limits regular, even preheating of the purifying device 9. The illustrated engine arrangement smoothes out the pulsating flow of air in the exhaust line 10, not only by separating the flow of air from the influence of similar pulsating flows of exhaust gases from cylinders 1, 2 and 3 but also by circuitously routing the pulsating flow, which lessens the distinction between successive pulses of air as the distance from the cylinder 4 increases.

The inventive process may be practiced by mixing the air from the cylinder 4 with fuel either before or after introducing the air into the purifying device 9. For example, the air may be mixed with fuel before introducing the air into the purifying device by delivering the air to the connecting exhaust line 8 when it is carrying excess fuel from the cylinders 5, 6 and 7 in the manner described above. The point at which the air is mixed with fuel depends generally upon the structure of the particular purifying device being used.

Figure 2:
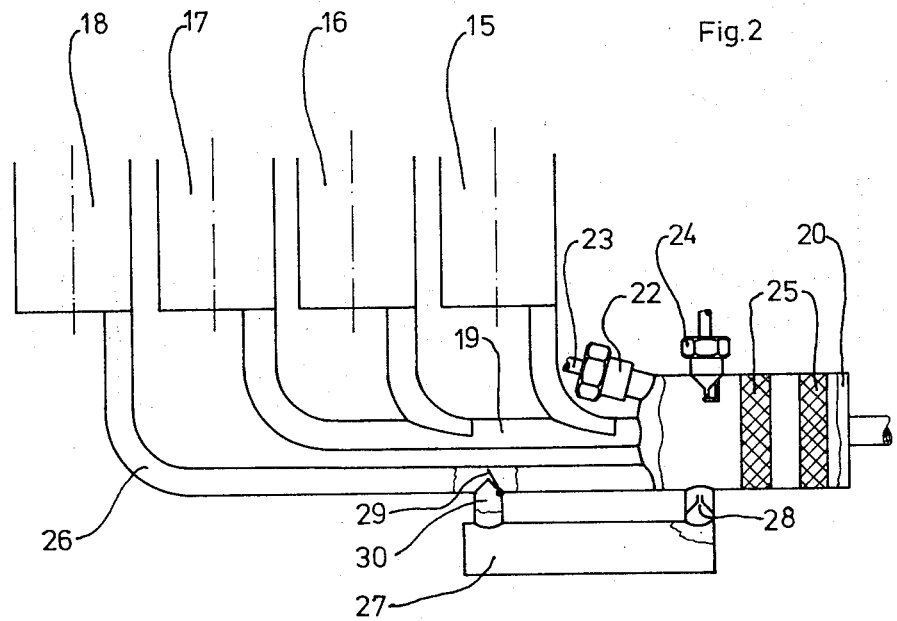
FIG. 2 is a schematic view of an internal combustion engine having in-line cylinders and an exhaust gas purifying device arranged to function according to the invention.

A second arrangement of an internal combustion engine and an exhaust gas purifying device incorporating the inventive process is illustrated in FIG. 2. The engine shown includes four cylinders 15, 16, 17 and 18. These cylinders are arranged in a line and communicate with a collecting exhaust line 19, which leads into a purifying device 20. Like the purifying device 9 of FIG. 1, the purifying device 20 includes a fitting 22 for receiving a fuel delivery line 23, a spark plug 24, and two catalysts 25.

The engine of FIG. 2 may be operated according to the invention in generally the same manner as the engine of FIG. 1. Fuel delivery to cylinder 18 is interrupted when starting the engine while cold and fresh air drawn in and exhausted by the cylinder 18 is carried by an exhaust line 26, separate from the common exhaust line 19, to the purifying device 20. In the purifying device 20, the fresh air encounters and is mixed with fuel from the fuel delivery line 23 and the mixture is ignited by the spark plug 24. When the purifying device has been preheated to its operating temperature, fuel delivery to the cylinder 18 is resumed and fuel delivery to the purifying device 20 is interrupted.

As in the engine of FIG. 1, the exhaust line 26 for the cylinder 18 is separate from the collecting exhaust line 19 and, since the cylinder 18 is the cylinder located farthest from the purifying device 20, the exhaust line 26 is relatively long. The length of exhaust line 26 serves to smooth and rectify the pulsating flow of air that is exhausted by the cylinder 18.

FIG. 2 also illustrates apparatus for carrying out an additional step in the inventive process. In the additional step, the air from the cylinder 18, or at least a portion thereof, is stored before it is introduced into the purifying device 20. Storing the air from the cylinder 18 further smoothes out its pulsating flow.

In the engine of FIG. 2, the exhaust line 26 from the cylinder 18 communicates with one end of a storage tank 27. The other end of the storage tank 27 communicates by way of a dosing nozzle 28 with the exhaust gas purifying device 20. During normal operation of the engine, a valve 29 closes off a connecting line 30 between the exhaust line 26 and the storage tank 27, permitting exhaust gases from the cylinder 18 to be carried by the exhaust line 26 directly into the purifying device 20. When the engine is being started while cold, however, the valve 29 moves to open the connecting line 30 and simultaneously to seal off the portion of the exhaust line 26 which is between the connecting line 30 and the purifying device 20 and which bypasses the storage tank 27. Since fuel delivery to the cylinder 18 is interrupted during a cold start, fresh air is exhausted by the cylinder 18 and is carried through the exhaust line 26 and the connecting line 30 into the storage tank 27. The air travels through the storage tank 27 toward the dosing nozzle 28, which permits only a small portion of the air supplied by the cylinder 18 to enter the purifying device 20. The remaining fresh air is held in the storage tank 27, to insure a continuous and even flow of air from the storage tank 27 through the dosing nozzle 28 into the purifying device 20. When the purifying device 20 has been preheated to its operating temperature and fuel delivery is resumed to cylinder 18, the valve 29 closes the connecting line 30 and opens the portion of the exhaust line 26 which bypasses the storage tank 27, so that exhaust gases from the cylinder 18 are delivered directly to the purifying device 20.

It is noted that the additional step of storing the air before introducing it into the purifying device 20, as permitted by the storage tank 27 and dosing nozzle 28, is optional and represents a further refinement of the present process. Similarly, the exhaust line 26 may communicate with the collecting exhaust line 19 to permit air from cylinder 18 to be introduced into the purifying device 20 together with exhaust gases from cylinders 15, 16 and 17. Also, fuel for the purifying device 20 may be introduced into the purifying device 20 through either of the exhaust lines 19 or 26, rather than or in addition to being introduced through the fuel delivery 23.

It will be understood that the above described process and apparatus for practicing the invention is merely exemplary and that those skilled in the art may make many variations and modifications in the exemplary process and apparatus without departing from the spirit and scope of the invention. All such modifications and variations are intended to be included within the scope of the invention as defined in the appended claims.

I claim:

1. A process for preheating an exhaust gas purifying device for an internal combustion engine having at least two cylinders, comprising the steps of:
    a. interrupting fuel delivery to at least one cylinder when starting the engine;
    b. introducing into the purifying device air drawn in and exhausted by said at least one cylinder; and
    c. igniting a mixture of fuel and said air in the purifying device.

2. The process defined in claim 1, wherein said air is introduced into the purifying device together with exhaust gases from other cylinders.

3. The process defined in claim 1, wherein said air is introduced into the purifying device separately from exhaust gases from other cylinders.

4. The process defined in claim 1, further comprising the step of mixing said air with fuel before introducing said air into the purifying device.

5. The process defined in claim 1, further comprising the step of mixing said air with fuel after introducing said air into the purifying device.

6. The process defined in claim 1, further comprising the step of storing at least a portion of said air before introducing it into the purifying device, thereby to smooth the flow of said air into the purifying device.

7. A process for preheating an exhaust gas purifying device for an internal combustion engine having at least two cylinders, comprising the steps of:
    a. interrupting fuel delivery to at least one cylinder when starting the engine;
    b. introducing into the purifying device air drawn in and exhausted by said at least one cylinder; and
    c. igniting in the purifying device a mixture of said air and fuel that includes excess fuel accumulated in and exhausted by other cylinders.

8. The process defined in claim 7, further comprising the step of mixing said air with said excess fuel before introducing said air into the purifying device.

9. The process defined in claim 7, further comprising the step of mixing said air with said excess fuel after introducing said air into the purifying device.

10. The process defined in claim 7, further comprising the step of storing at least a portion of said air before introducing it into the purifying device, thereby to smooth the flow of said air into the purifying device.

* * * * *